United States Patent [19]
Lahr

[11] Patent Number: 5,414,411
[45] Date of Patent: May 9, 1995

[54] PULSE INDUCTION METAL DETECTOR

[75] Inventor: William E. Lahr, Compton, Calif.

[73] Assignee: White's Electronics, Inc., Sweet Home, Oreg.

[21] Appl. No.: 81,030

[22] Filed: Jun. 21, 1993

[51] Int. Cl.$^6$ .................. G08B 13/14; G01V 3/10
[52] U.S. Cl. .................................... 340/568; 324/329
[58] Field of Search .............. 340/568, 572, 551; 324/329, 326, 239

[56] References Cited

U.S. PATENT DOCUMENTS

| | | | |
|---|---|---|---|
| 3,315,155 | 4/1967 | Colani | 324/239 |
| 4,110,679 | 8/1978 | Payne | 324/329 |
| 4,249,128 | 2/1981 | Karhowski | 324/329 |
| 4,507,612 | 3/1985 | Payne | 324/329 |
| 4,514,692 | 4/1985 | Johnson et al. | 324/329 |
| 4,531,117 | 7/1985 | Nourse et al. | 340/572 |
| 4,600,356 | 7/1986 | Bridges et al. | 324/329 X |
| 4,677,384 | 6/1987 | Payne | 324/329 |
| 4,783,630 | 11/1988 | Shoemaker | 324/329 |
| 4,821,023 | 4/1989 | Parks | 340/551 |
| 4,881,036 | 11/1989 | Ausländer et al. | 324/329 |
| 4,894,618 | 1/1990 | Candy | 324/329 |
| 4,912,414 | 3/1990 | Lesky et al. | 324/329 |

OTHER PUBLICATIONS

William Lahr, "Hunting with A 'Homebrew'", *Western & Eastern Treasures*, pp. 27-28, Jun. 1985.
"Impuls-Metalldetektor", *Elrad*, pp. 28-34, Sep. 1985.
"P.I. Metal Detector", *Practical Wireless*, pp. 48-54, Jan. 1979.

*Primary Examiner*—Brent Swarthout
*Assistant Examiner*—Thomas J. Mullen, Jr.
*Attorney, Agent, or Firm*—Chernoff, Vilhauer, McClung & Stenzel

[57] ABSTRACT

Metal detector apparatus includes an increased pulse transmit frequency and reduced integration time constant for rapid target response and improved sensitivity to low conductivity metals, including cupro-nickel alloys, platinum and gold. Resistor-capacitor (RC) coupling totally eliminates the need to reset the controls due to changes in temperature or mineralization in the area being searched. The short time constant used in the RC coupling circuit improves the overall stability while reducing noise, allowing for greater amplification in the audio stages. The time constant of the RC coupling stage is equal or similar to the time constant of the integrator. The audio tone is derived from the pulse transmit clock which is synchronous with the power supply inverter to reduce noise and instability in the system.

15 Claims, 2 Drawing Sheets

PULSE INDUCTION METAL DETECTOR

BACKGROUND OF THE INVENTION

1. Field of the Invention

This invention relates to metal detectors operating according to the pulse induction principle which have the ability to sense metal objects deeply buried within conductive salts and heavily mineralized ferromagnetic sands.

2. Description of the Prior Art

Pulse Induction metal detection devices are well known in the art and are highly regarded for their ability to operate in extreme ground conditions. An example of such a device is shown in Colani, U.S. Pat. No. 3,315,155. Such devices utilize a pulse generator connected to a power amplifier. The power amplifier sends a short pulse of high current into a search coil, which consists of a simple coil of wire, producing a magnetic field. As the current is cut off, the collapsing magnetic field generates a "reflected pulse" which is opposite in polarity and many times greater in amplitude than the original current pulse. The reflected pulse causes electric currents to flow in any metal objects within its range. These electric currents act upon the reflected pulse so as to lengthen the time it takes to decay to zero. The increase in time changes the slope of the decaying portion of the reflected pulse. This change in the slope is detected and converted to a DC potential which is proportional to the change in the duration of the reflected pulse, and controls the audio indicating device to alert the user to the presence of a buried metal object.

Most pulse induction metal detectors previously known in the prior art operate at a pulse transmit frequency in the range of 85 to 150 pulses per second. The duration of the transmit pulse is typically in the range of 365 microseconds.

In practice, the Pulse Induction metal detectors known in the prior art have several disadvantages. In order for such devices to be able to detect a metal object at some distance from the search coil, they must have a very high gain receiver. A high gain receiver, however, which increases sensitivity, also results in an increase in the amount of random noise and false signals.

The overall sensitivity of the Pulse Induction metal detector depends upon many factors, the most important being the point at which the sampling occurs. The sampling point in most pulse induction metal detectors generally falls between 40 and 80 microseconds after the leading edge of the reflected pulse as measured at the output of the high gain amplifier. Reduced delay times can increase the sensitivity, but also increase noise, drift and instability. Adjusting the tuning controls can be especially difficult due to the DC coupling between the amplifier stages. Increasing the delay times improves stability and reduces noise, but causes a corresponding reduction in the depth of detection. Lower conductivity metals, such as gold, platinum and cupronickel alloys, may not be detected at longer sampling delays.

Pulse samples must be integrated over time and pulse induction metal detectors known in the art use a relatively long integration time constant, typically between 220 and 1000 msec. The long time constant averages the sampled pulses over a longer time to reduce noise and improve the signal to noise ratio and stability of the DC coupled circuits. In practice, these long integration time constants require that a slow coil sweep be used. If the coil is swept too quickly, the integrator may not respond to a metal target and there will be no audio response. Long integration time constants also produce a broad audio signal which causes some difficulty in locating the exact center of the target.

Pulse induction metal detectors commonly use a VCO audio circuit that can be very critical to adjust. A DC offset control is set so that the VCO stage remains on the verge of producing an audio signal. This is usually the point where an occasional clicking or growling sound is heard. This sound changes to a high-pitched squeal when a metal object is in the field of the search coil. The pitch increases in proportion to the reduction in the distance between the metal object and the search coil, where the pitch of the audio tone is used to locate the center of the object being detected. In practice, the VCO audio can be erratic, unstable and annoying. The operator must check the offset adjustment frequently to be sure the VCO stage is set properly or a reduction in the depth of detection will result.

SUMMARY OF THE INVENTION

According to the present invention a pulse induction metal detector includes a search coil and a pulse generator for driving the search coil with a series of pulses of a predetermined duration and frequency. A pulse sampling network is coupled to the search coil for sampling signals on the search coil at predetermined times to provide sampled pulse induction signals. An integrator network is responsive to the sampled pulse induction signals which has a predetermined but relatively fast response characteristic or time constant. The output of the integrator circuit is coupled to an RC coupling circuit which has substantially the same time constant as the integrator circuit. The output of the RC coupling circuit is connected to an audio circuit which generates an audio tone, the intensity of which indicates the proximity and size of metal objects.

In order to minimize extraneous sources of noise, the frequency of the pulse generator is fixed and is synchronized to the power supply voltage converter and the electronic circuit that generates the audio tone. In this way ripples from the power supply voltage converter do not find their way into the high gain amplifier and pulse sampling circuits to create false indications of the presence of metal objects.

In the preferred embodiment the frequency of the pulse generator is relatively high compared with conventional pulse induction metal detectors and should have a frequency that exceeds 400 cycles per second. The delay time for the sampling pulse is adjustable and lies in a range of 20 to 100 microseconds with reference to the leading edge of the reflected pulse. In this way certain targets may be eliminated because of the insensitivity of the system to certain types of metal at relatively long pulse delays.

The high frequency of transmitted pulses together with a relatively fast integration time of 100 msec and the fast response RC coupling network (also 100 msec) all cooperate to produce a pulse induction metal detector that can detect low conductivity, nonferrous metals such as gold in highly mineralized environments. The system uses a differential integrator circuit to eliminate common mode noise. A short sampling delay, the fast integrator response time, together with the RC coupling network having the same time constant, permits a faster sweep of the target area without an accompanying reduction in sensitivity, increase in noise, or false signals and better discrimination between ferrous and more valuable non-ferrous metals of lower conductivity.

DESCRIPTION OF THE PREFERRED EMBODIMENT

Figure 1:
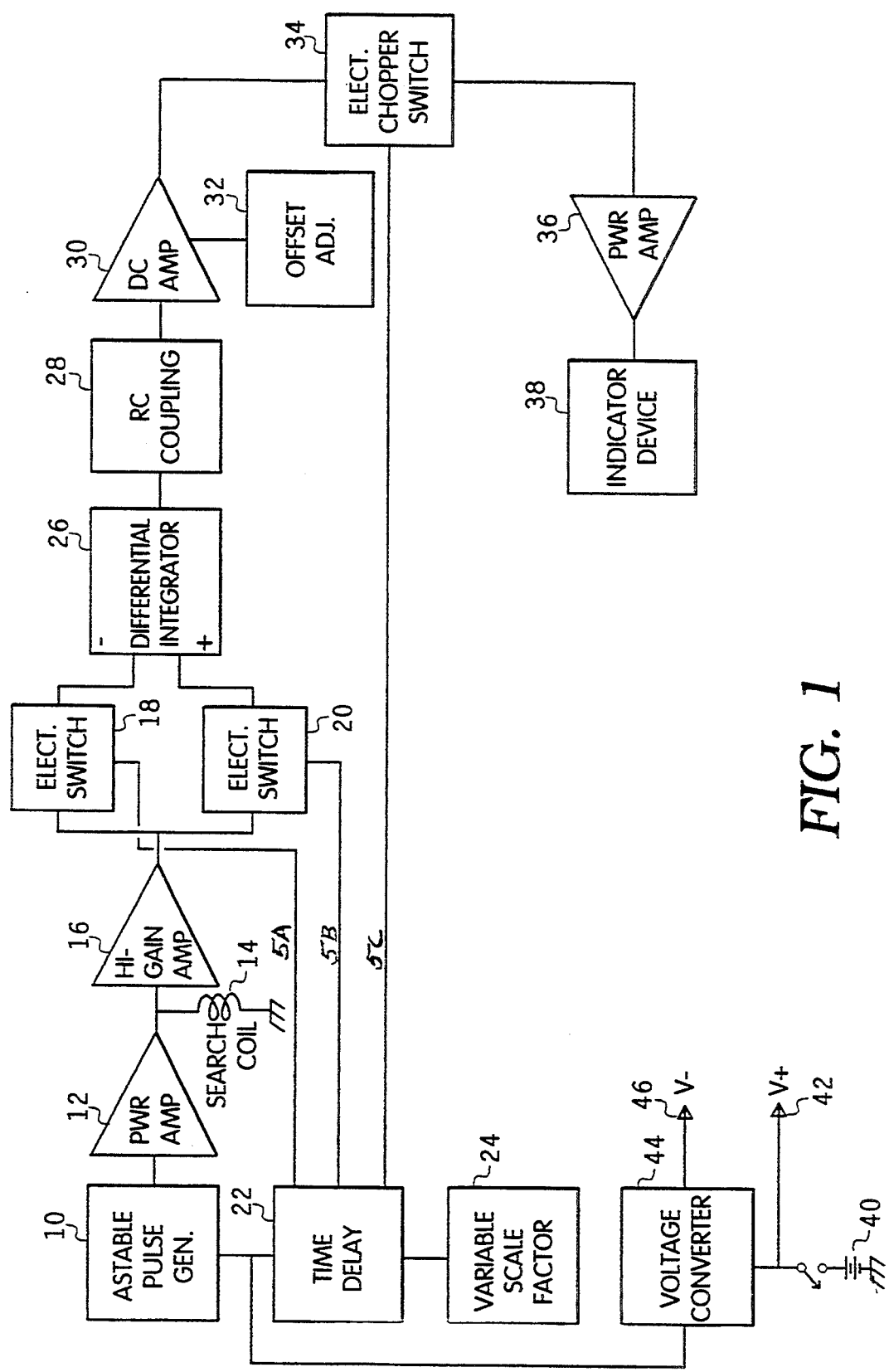
FIG. 1 is a block schematic diagram of the pulse induction metal detector of the present invention.

FIG. 1 is a block diagram of the pulse induction metal detector of the present invention. Astable pulse generator 10 generates a train of pulses of 60 microseconds duration which occur at intervals of 1.65 msec. This corresponds to a transmit frequency of approximately 600 pulses per second. The pulses from astable generator 10 are amplified by a power amplifier 12 which drives a search coil 14. A suitable resistance (not shown) is placed in parallel with search coil 14. The resulting transmit and reflected pulses which occur across the search coil 14 are amplified by a high gain amplifier 16. The resulting signals at the output of high gain amplifier 16 are sampled by electronic switches 18 and 20.

The pulses from astable generator 10 are processed by a time delay circuit 22 to provide three sample pulses. The sample pulse on line 5A has a duration of 30 microseconds and occurs 20 microseconds after the leading edge of the reflected portion of the waveform as measured at the output of high gain amplifier 16. The sample pulse on line 5B has a duration of 30 microseconds and occurs 150 microseconds after the sample pulse on line 5A. An audio chopper pulse on line 5C has a duration of 150 microseconds. The audio chopper pulse provides the switching signal for generating the audio tone. A variable scale factor circuit 24 is user adjustable to increase the delay of pulses on lines 5A, 5B and 5C by up to 100 microseconds for the purposes of eliminating the response to certain lower conductivity targets.

The reflected portion of the signal from the high gain amplifier 16 is sampled by electronic switches 18 and 20. Switch 18 is connected to the inverting input of a differential integrator 26. Switch 20 is connected to the non-inverting input of the differential integrator 26. The purpose of the differential integrator 26 is to cancel the effects of any residual DC voltage or sinusoidal waveform so as to improve stability and reduce noise. The sampled pulses from switches 18 and 20 are converted to a DC reference voltage by the differential integrator 26 which has an integration time constant of about 100 msec which aids in locating non-ferrous metals and permits a faster sweep. The varying DC output voltage of the differential integrator 26 is directly proportional to the width of the reflected pulse, which changes in relation to the presence of metal objects within the search coil field.

The DC voltage at the output of the differential integrator 26 is connected to an RC coupling circuit 28. This circuit prevents any static DC voltage at the output of the differential integrator 26 from being amplified by a DC amplifier 30 while passing the changing output of the integrator. An increase in the integrator output results in an increase in the DC level at the input to amplifier 30, after which this input voltage is reduced to zero by the RC coupling circuit 28. An offset adjustment 32 sets the minimum reference, or threshold, level for the following audio section.

The purpose of the RC coupling circuit 28 is to provide dynamic coupling with a self-adjusting threshold action to improve the ease of use and overall stability of the system. As used herein, the term "RC coupling circuit" refers to a network that includes a DC blocking capacitor and a resistor connected to ground for discharging the capacitor. The time constant of the RC coupling circuit 28 is 100 msec which is equal to the time constant of the differential integrator 26. The fast response characteristic of the integrator together with RC coupling allows the operator to identify certain types of buried metals. Most ferrous objects will produce a broader audio tone. Elongated ferrous objects, such as nails, will often produce a double tone. Nonferrous objects, such as gold and silver, will produce a much more intense and abrupt audio response. This response would ordinarily be missed by detectors having slower integration time constants, standard DC coupling and long sampling delays.

The signal voltage that appears at the output of the DC amplifier 30 is connected to chopper switch 34 and the input of a power amplifier 36. The chopper switch 34 is controlled by the audio sample pulse on line 5C from time delay network 22. The audio sample pulse on line 5C is derived from the astable pulse generator 10 by the time delay 22 which results in an audio tone of approximately 600 Hertz. This is the same as the pulse transmission frequency.

When the output of amplifier 30 increases, the resulting DC voltage is converted to an AC signal by the chopper switch 34. This AC signal is amplified by a power amplifier 36 to drive an indicator device 38, which may be either a speaker or headphone. A light emitting diode, lamp or other visual indication device (not shown) may also be connected across the audio output indicator 38. The intensity and duration of the resulting audio tone is directly proportional to the size and distance of the metal object being detected in relation to the search coil.

In the power supply a battery 40 supplies power to positive voltage rail 42 and to power supply voltage converter 44. Power supply voltage converter 44 produces the negative voltage rail 46 required by the circuit components. The voltage converter 44 operates at a higher frequency than the astable generator 10, however, it is synchronous with astable generator 10, time delay 22 and audio chopper 34 to reduce or eliminate internally generated noise. The converter frequency is thus integrally related to the frequency of the aforementioned components. If desired, the converter frequency may be the same as that of these other components.

Figure 2:
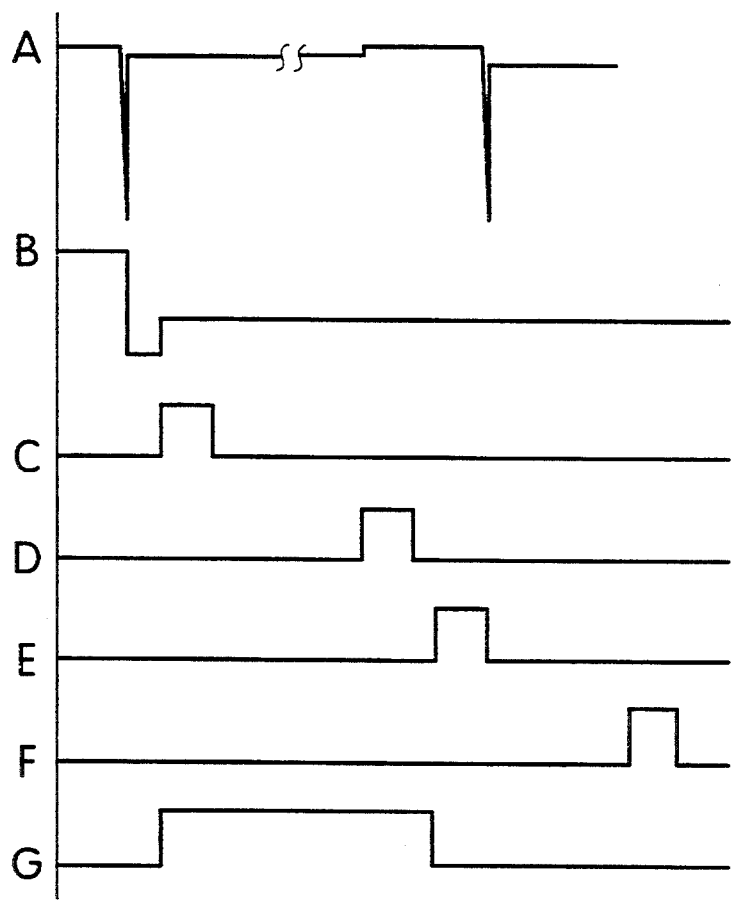
FIG. 2 is a first set of waveform diagrams illustrating the operation of the pulse generator, time delay, scale factor and pulse sensing portions of the block schematic diagram of FIG. 1.
Figure 3:
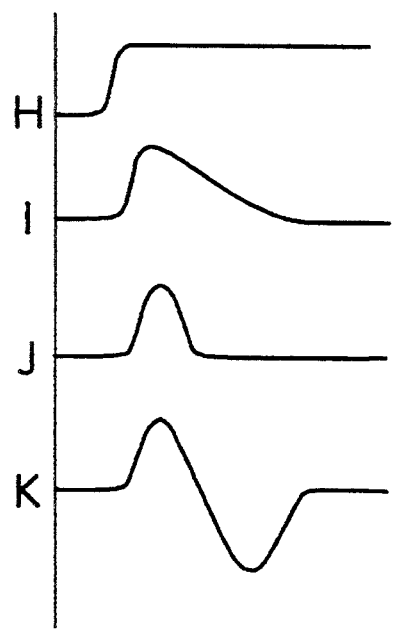
FIG. 3 is a second set of waveform diagrams illustrating the operation of the differential integrator and RC coupling portions of the schematic diagram of FIG. 1.
Figure 4:
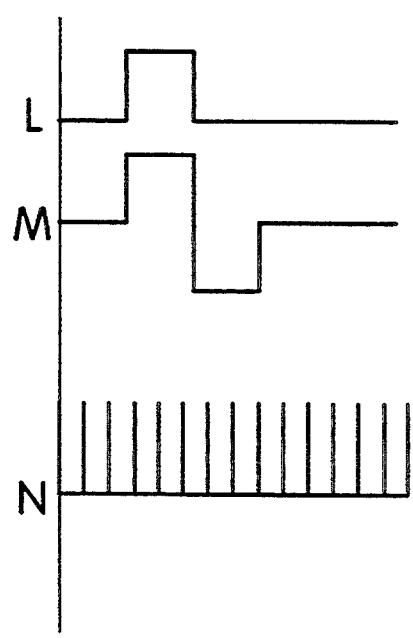
FIG. 4 is a third set of waveform diagrams illustrating the operation of the DC amplifier, chopper switch and power audio amplifier portions of the block schematic diagram of FIG. 1.

Referring now to FIGS. 2, 3 and 4, waveform A shows the transmit signal as viewed across the search coil 14 and its damping resistor (not shown). The positive portion of waveform A represents the transmit current pulse supplied by the power amplifier 12. In the preferred embodiment, this pulse typically has an amplitude of ten volts and a duration of 60 microseconds. The negative portion of waveform A represents the reflected pulse induced by the collapse of the current pulse from the transmitter. In the preferred embodiment, the amplitude of the reflected pulse is between 100 and 130 volts and the transmit pulses are repeated at intervals of approximately 1.65 msec.

Waveform B represents the signal present at the output of the high gain amplifier 16. The signal at the input of the high gain amplifier 16 is limited by clamping diodes to less than one volt peak to peak. The voltage gain of high gain amplifier 16 is typically in the order of 60 decibels. The positive portion of waveform B represents the transmitted current pulse and the negative portion represents the corresponding reflected pulse as it decays to zero. In the preferred embodiment, the width of said transmit pulse is 60 microseconds and the width of the reflected pulse is approximately 20 microseconds as measured at the zero reference.

Waveform C represents a sample pulse on line 5A from the time delay circuit 22 with the variable scale factor 24 adjusted for minimum delay. In the preferred embodiment, this pulse has a duration of 30 microseconds and a delay of 20 microseconds with reference to the leading edge of the reflected pulse B as measured at the output of the high gain amplifier 16. The short delay time picks up signals caused by metals of lower conductivity such as gold jewelry and the like.

Waveform D represents a sampling pulse on line 5A with variable scale factor 24 adjusted for maximum pulse delay. In the preferred embodiment, the delay of a sampling pulse with reference to the leading edge of the reflected pulse at the output of the high gain amplifier 16 is adjustable with pulse delays from the variable scale factor 24 in the range of 20 to approximately 100 microseconds to provide selective target rejection of aluminum foil, cupro-nickel, gold, aluminum pull tabs, steel bottle caps and similar non-ferrous material. Waveforms E and F represent sample pulses on line 5B from the time delay circuit 22. They are adjustable like sample pulses C and D, however, in the preferred embodiment, pulses D and F have an additional delay of approximately 150 microseconds with reference to sample pulses C and D.

Waveform G represents the audio chopper reference signal on line 5C. In the preferred embodiment, pulse G has a duration of 150 microseconds. The position of pulse G relative to the leading edge of the reflected pulse at the output of high gain amplifier 16 will vary with the setting of the pulse delay variable scale factor 24. Pulse G is used to generate the audio output signal and will remain synchronized with sample pulse C or D to reduce noise and improve the stability of the system.

Referring to FIG. 3, waveform H represents the signal which appears at the output of the differential integrator 26 as a metal object moves into, and remains stationary within, the search coil field. The peak amplitude of this signal occurs when the metal object is in the center of the search coil. Waveform I represents the signal which appears at the output of differential integrator 26 as a metal object moves into and out of the search coil field.

Waveform J represents the signal which appears at the output of the RC coupling circuit 28 as a metal object moves into and remains stationary within the search coil field. The amplitude increases briefly in a positive direction as the metal object nears the search coil. The waveform amplitude then decreases to ground in a ramp function as the resistor in the RC coupling circuit discharges the signal voltage to zero.

Waveform K represents the signal which appears at the output of RC coupling circuit 28 as a metal object moves into and out of the search coil field. As the target passes the center of the search coil, the signal briefly goes negative before returning to zero. In the preferred embodiment, the time constant of the RC coupling circuit is 100 msec and is substantially equal to the time constant of differential integrator 26.

Waveform L represents the output signal of DC amplifier 30 when a metal object enters and remains stationary within the search coil field. The width of the output pulse is proportional to the size of the object being detected and its distance from the search coil. Waveform M represents the output signal of DC amplifier 30 when a metal object moves into and out of the search coil field. The signal represented by waveform M is positive when the metal object moves toward the search coil and is negative when the metal object moves away. A DC offset adjust 32 is used to set the zero-signal DC reference level at the output of DC amplifier 30 for the purposes of adjusting the audio threshold level under zero-signal conditions.

Waveform N represents the output signal from the power amplifier 36 under full signal conditions. In the preferred embodiment, power amplifier 36 operates under Class C conditions. Electronic chopper switch 34 is connected so as to ground the input of power amplifier 36 whenever audio chopper reference signal G is positive at the control terminal of switch 34. The action of chopper switch 34 converts the pulse at the input of power amplifier 36 to an audio signal. In the preferred embodiment, the frequency of the audio tone is approximately 600 Hertz which corresponds to a transmit pulse repetition rate of approximately 600 pulses per second. Both of these frequencies are in any event integrally related to the frequency of the power supply voltage converter so that they are synchronized with the switching signals generated therein. In the preferred embodiment, the output of power amplifier 36 is connected to a waterproof, piezoelectric headphone, although a dynamic speaker, bone conduction device, mechanical vibrator or similar transducer may be used. A visual indication device (not illustrated) may also be connected to the output of power amplifier 36.

The power source for the preferred embodiment consists of eight AA sized alkaline dry batteries which provide an expected useful life of 25 to 35 hours. The required differential power supplies are provided by a fixed voltage regulator and a voltage inverter/regulator. In the preferred embodiment, the voltage inverter/regulator operates at a frequency that is higher than, but synchronized with, the astable pulse generator 10 to minimize noise from the power supply.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a pulse induction metal detector including a search coil and having a pulse generator for driving the search coil with a series of pulses of a predetermined duration and frequency, the combination comprising:

(a) a pulse sampling network coupled to an output of the search coil;

(b) an integrator network coupled to an output of said pulse sampling network, said integrator network having a first time constant;

(c) an RC coupling circuit connected to an output of said integrator network, said RC coupling circuit having a second time constant, said second time constant being substantially the same as said first time constant; and (d) an audio circuit coupled to an output of the RC coupling circuit, said audio circuit generating an audio tone of a preset frequency indicative of the presence of metal objects.

2. The pulse induction metal detector of claim 1 wherein the preset frequency of the audio tone is synchronized to the frequency of the pulse generator.

3. The pulse induction metal detector of claim 1 wherein the frequencies of the pulse generator and audio tone, respectively, are both greater than 400 cycles per second.

4. The pulse induction metal detector of claim 1 wherein the respective frequencies of the audio tone and pulse generator are equal.

5. The pulse induction metal detector of claim 1 wherein output pulses of the search coil are sampled by the pulse sampling network at predetermined times which are adjustable in a range between 20 and 100 microseconds from the leading edges of said series of pulses.

6. The pulse induction metal detector of claim 1 wherein said first and second time constants are chosen to provide a relatively fast response characteristic for the integrator network and the RC coupling circuit, respectively.

7. In a pulse induction metal detector having a search coil and a sampling network for periodically sampling the output of the search coil to derive therefrom pulse induction signal pulses indicative of the presence of metal objects, the combination comprising:

(a) a power supply including a voltage converter operating at a first frequency for generating supply voltages;

(b) a coil pulse generator having an input coupled to the voltage converter and an output coupled to the search coil, said coil pulse generator operating at a second frequency which is integrally related to the first frequency and is synchronized to the voltage converter; and (c) an audio tone generator coupled to the voltage converter and providing a series of audio pulses indicative of the presence of metal objects at a third frequency, said third frequency being integrally related to the first frequency and synchronized thereto.

8. The pulse induction metal detector of claim 7 wherein the audio tone generator is an electronic chopper switch.

9. The pulse induction metal detector of claim 8 where the chopper switch is controlled by a time delay network coupled to an output of the coil pulse generator.

10. The pulse induction metal detector of claim 7 wherein the second and third frequencies are the same.

11. The pulse induction metal detector of claim 10 wherein the first frequency of the voltage converter is the same as said second and third frequencies.

12. In a pulse induction metal detector including a search coil and having a pulse generator for driving the search coil with a series of pulses of a predetermined duration and frequency, the combination comprising:

(a) a pulse sampling network coupled to a pulse output of the search coil, said pulse sampling network including a pair of switches, each switch of said pair being activated at a different time for providing first and second pulse samples of the pulse output of the search coil;

(b) a differential integrator network coupled to said pair of switches to receive as input said first and second pulse samples; and (c) an audio tone generator network coupled to an output of the differential integrator network.

13. The pulse induction metal detector of claim 12 wherein the audio tone generator network is RC coupled to the differential integrator network.

14. The pulse induction metal detector of claim 12 further including a time delay network coupled to said pulse generator for controlling the activation of said pair of switches.

15. The pulse induction metal detector of claim 14 wherein said audio tone generator network includes an electronic chopper switch controlled by an output of the time delay network to generate an audio tone of a preset frequency.

* * * * *